(12) United States Patent
Benson et al.

(10) Patent No.: US 8,539,827 B2
(45) Date of Patent: Sep. 24, 2013

(54) WATER METER WITH INTEGRAL FLOW RESTRICTION VALVE

(75) Inventors: Ronald D. Benson, Colgate, WI (US); Eric Metzger, Milwaukee, WI (US)

(73) Assignee: Badger Meter, Inc., Milwaukee, WI (US)

( * ) Notice: Subject to any disclaimer, the term of this patent is extended or adjusted under 35 U.S.C. 154(b) by 426 days.

(21) Appl. No.: 13/017,264

(22) Filed: Jan. 31, 2011

(65) Prior Publication Data

US 2012/0193559 A1 Aug. 2, 2012

(51) Int. Cl.
*G01F 15/02* (2006.01)

(52) U.S. Cl.
USPC .......... 73/199; 251/129.01; 340/12.5; 73/203

(58) Field of Classification Search
None
See application file for complete search history.

(56) References Cited

U.S. PATENT DOCUMENTS

| | | |
|---|---|---|
| 3,779,388 A | 12/1973 | Coughlin |
| 3,795,144 A | 3/1974 | Marchesi |
| 4,159,025 A | 6/1979 | Harthan |
| 5,517,855 A | 5/1996 | Dewald |
| 5,559,289 A | 9/1996 | Brunson, IV et al. |
| 5,913,236 A | 6/1999 | Wodeslavsky |
| 6,491,062 B1 | 12/2002 | Croft |
| 6,708,722 B1 | 3/2004 | Goodenough |
| 6,892,751 B2 | 5/2005 | Sanders |
| 6,994,309 B2 | 2/2006 | Fernandez-Sein |
| 2005/0236594 A1 | 10/2005 | Lilly et al. |
| 2007/0284293 A1 | 12/2007 | Pitchford et al. |

OTHER PUBLICATIONS

Selection Guide, Recordall Disc Series Meters, Badger Meter, Inc., RD-S-10, Jul. 2010 (4 pages).
Technical Brief, Recordall Cold Water Bronze Disc Meter, Badger Meter, RD-T-⅝ × ¾, Oct. 2010 (2 pages).
Electric Valve models 45 EL size 1" (25mm), Dorot Control Valves, (2) pages.
GEVA 60 ⅛" Latch Solenoid Valve, Pulse Operated 3/2 Way 2 or 3 wires, Dorot Control Valves, (1)page.

*Primary Examiner* — Harshad R Patel
(74) *Attorney, Agent, or Firm* — Boyle Fredrickson, S.C.

(57) ABSTRACT

A water meter (10) and a flow control valve (30) are housed in a common pressure vessel (16), in which the flow control valve (30) restricts flow through a metering chamber (18) to less than the normal flow, while still permitting a flow sufficient for basic human needs, rather than completely interrupting supply of the utility, and in which the flow control valve (30) is controlled electrically through a control valve (40) in an energy efficient manner so as to utilize power from a self-contained power source (27) in another device (25) at the customer site (50).

22 Claims, 3 Drawing Sheets

WATER METER WITH INTEGRAL FLOW RESTRICTION VALVE

TECHNICAL FIELD

This invention relates to utility metering equipment and to shut-off valves for interrupting the supply of water from a public utility to a customer.

DESCRIPTION OF THE BACKGROUND ART

Utility metering equipment is often provided with a radio transmitter or a radio transceiver (receiver/transmitter) for transmitting meter consumption data to radio receiver in a meter data collection network. Some networks for collection metering data have provided the ability to control devices at the metering site by using a two-way communication through a site transceiver. In recent years, utilities and equipment providers have been considering alternatives for shut-off of service in emergency events, for conservation purposes, or in the event of non-payment of utility bills. Therefore, various methods for remote shut-off of the utility water supply are being investigated.

There are products currently be offered on the market to perform a water supply shut-off, but they require the use of a valve external to the water meter or a radio requiring an external source of power for operation. This requires the customer to run an additional power source to the meter and to modify their plumbing to accommodate the additional lay length of the external valve.

Marchesi, U.S. Pat. No. 3,795,144, discloses a manually operable shut-off valve having a housing that is integrated with a water meter housing. The purpose of this construction is to prevent removal of the valve without also removing the meter and thereby causing an inconvenience to the owner of flooding of the establishment (col. 5, lines 5-8). It is thus a tamper-resistance measure.

The constructions known in the art do not provide the convenience and functionality desired in controlling or limiting supply of a utility to a customer under the various conditions present today.

SUMMARY OF THE INVENTION

This invention houses a water meter and a flow control valve in a common pressure vessel, wherein the flow control valve is a flow restriction valve rather than a complete shut-off valve.

In one more detailed aspect, the invention provides a flow control valve having a valve member disposed in a portion of a pressure vessel for movement between an open position allowing normal, unrestricted flow through a metering chamber and a flow restriction position in which flow in the metering chamber is limited to significantly less than the normal flow. The flow restriction allows flow through the metering chamber that is significantly less than the normal flow, but is a measureable flow sufficient for basic human needs.

In another more detailed aspect, the combination has the same length as a water meter not having the flow restriction control valve so as to enable easy installation of the flow restriction apparatus. This allows the valve/meter assembly to simply replace an existing water meter, without requiring significant modifications to a customer's plumbing.

In a further more detailed aspect of the invention, an electrically operable control device is provided to cause the flow control valve to restrict flow through the metering chamber to less than normal flow; and the electrical control device receives power from a self-contained power source within a radio transceiver that is located at a customer's site with the water meter. This improves over shut-off devices requiring power from a building's power system, for example In further details of this aspect of the invention, the flow control valve is controlled by an electrically operable solenoid and has an actuator which is operated by water pressure to reduce the electrical power required for actuation. This enables power to be obtained from a battery-powered remote transmitter and this is sufficient for actuation of the valve between an open position and a flow restriction position.

In a more detailed aspect of the flow control valve construction, a mechanism is provided for utilizing the valve to restrict and reduce flow, rather than to completely interrupt the flow. This is provided by a type of valve in which a plurality of spaces between spool bodies are moved with the valve spool from an aligned open position with openings in a valve cage to an offset position where the spool bodies restrict flow through the openings in the valve cage. Even in the misaligned position, the lack of a resilient seal between the valve parts means that some water will still pass through the valve. This can be adjusted by adjusting the tolerance and spacing of the valve parts to allow more or less water to pass down to a minimum. By restricting the flow of water to a very low volume, instead of completely shutting off the supply the above purposes might be served while humanely allowing the customer to have a limited water supply, for basic uses.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION

Figure 1:
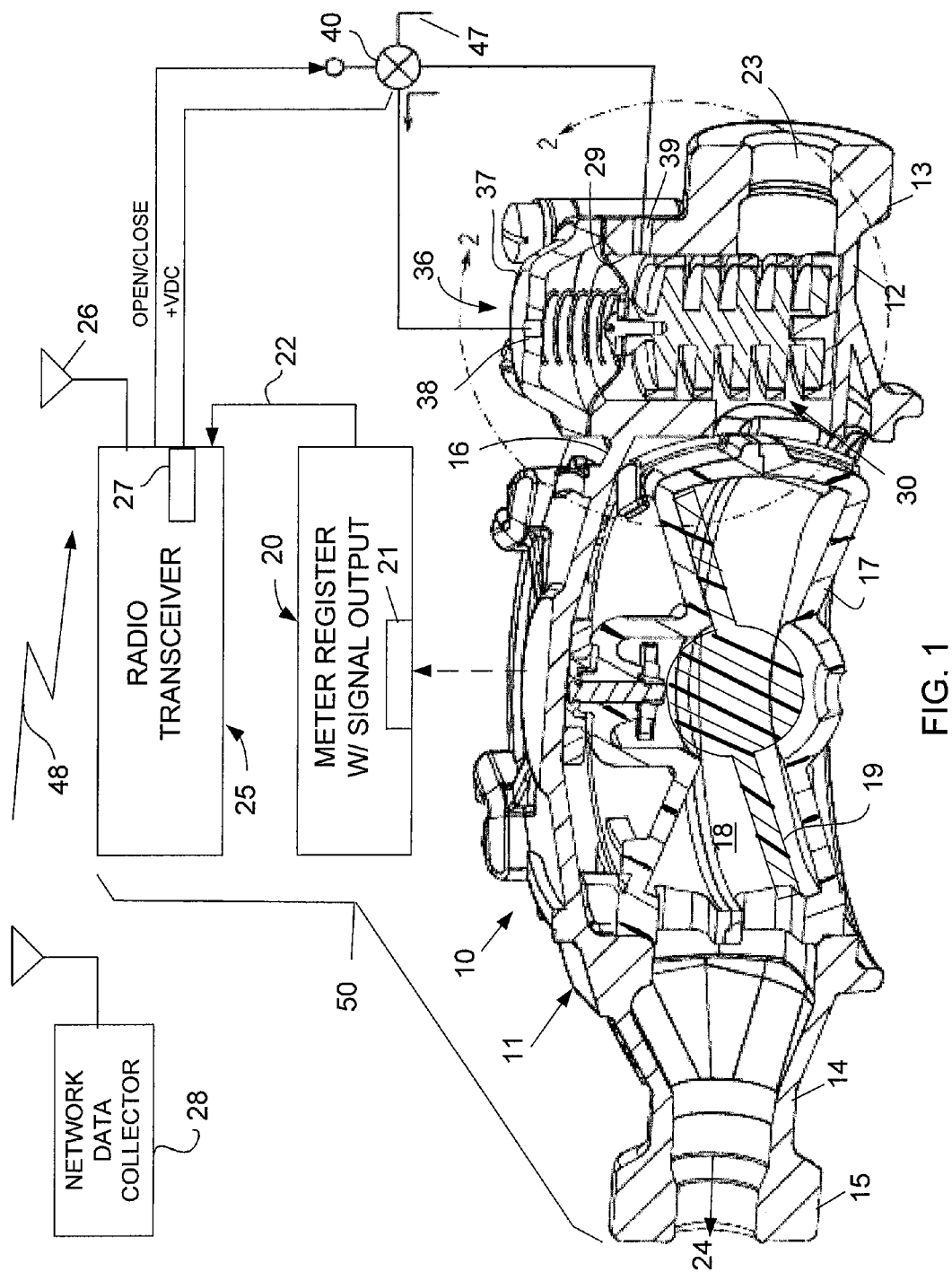
FIG. 1 is a perspective sectional view of a metering assembly of the present invention with the control circuit being shown schematically.

FIG. 1 shows an assembly of the present invention. A disc-type water meter 10 includes a meter housing 11 comprising a pressure vessel made from at least one of a low-lead bronze alloy casting, other metals, other metal alloys or plastics. The meter housing 11 includes a tubular inlet conduit 12 leading to a threaded spud end 13, a tubular outlet conduit 14 leading to a threaded spud end 15 and a cylindrical body 16. Inside the cylindrical body, a disc-type meter assembly is disposed and a cover plate (not shown) is bolted to the bottom of the housing 11 to complete the enclosure as is known in the art. The spud ends 13, 15 can be replaced by coupling flanges in larger sized meters.

The disc-type meter assembly includes a meter casing 17. Inside this inner casing 17 is a main metering chamber 18. The flow from the inlet 23 to the outlet 24 of the meter housing 11 through the metering chamber 18 is not necessarily a straight path, as the inlet and outlet into the disc metering chamber are often located near each other. For an example of this flow path, reference is made to U.S. Pat. No. 6,948,363, assigned to the assignee herein. Inside this chamber 18 is a nutating disc plate 19 of a type well known in the art in which a flat disc-shaped member is integrated with and supported on a pivoting ball. The rotating movement of the disc plate 19 is sensed by a magnetic pickup 21 in a meter register 20 mounted on the meter housing 11. The magnetic pickup 21 is connected to a gear train, as disclosed in Strobel, U.S. Pat. No. 4,868,566 and other patents granted to the assignee herein, which converts revolutions of the magnetic pickup 21 to rotations of a gear representing units of consumption for water flowing through the metering chamber 18.

As known from Strobel, U.S. Pat. No. 4,868,566, these rotations are converted to electrical pulses which are counted as units of consumption of water. These signals 22 are transmitted through a cable to a radio transceiver 25 in the case of a separate assembly. In alternative embodiments, these signals 22 can also be transmitted through an internal electrical connection to a radio transceiver 25 that is assembled with the meter register 20 in a single housing or an integrated housing.

The radio transceiver 25 includes a radio transmitter portion and a radio receiver portion. The radio transmitter portion converts the utility consumption signals to a radio frequency signaling protocol for transmission back to a network data collector 28 through a wireless network. Although, this embodiment includes an electromechanical type of meter register, it should be understood that the invention can be practiced with electronic types of meter registers that have been more recently developed. As long as some type of electric signal generating meter register 20 is used, it will typically be used with a radio transceiver 25, which is a necessary element in the present embodiments to receive command signals 48 to operate a flow restriction valve 30.

Although a disc type water meter 10 is shown and described, the invention in its broadest scope can also be applied to other types of water meters, including turbine type meters, mag meters and ultrasonic meters.

The invention can be practiced with several categories of flow restriction valves including poppet valve, rotating ball valves, diaphragm-actuated valves, and sliding gate valves. In the present invention, a spool valve 30 which is a more complex version of a sliding gate valve is used to restrict flow, rather than to shut-off flow entirely to a customer.

Figure 2:
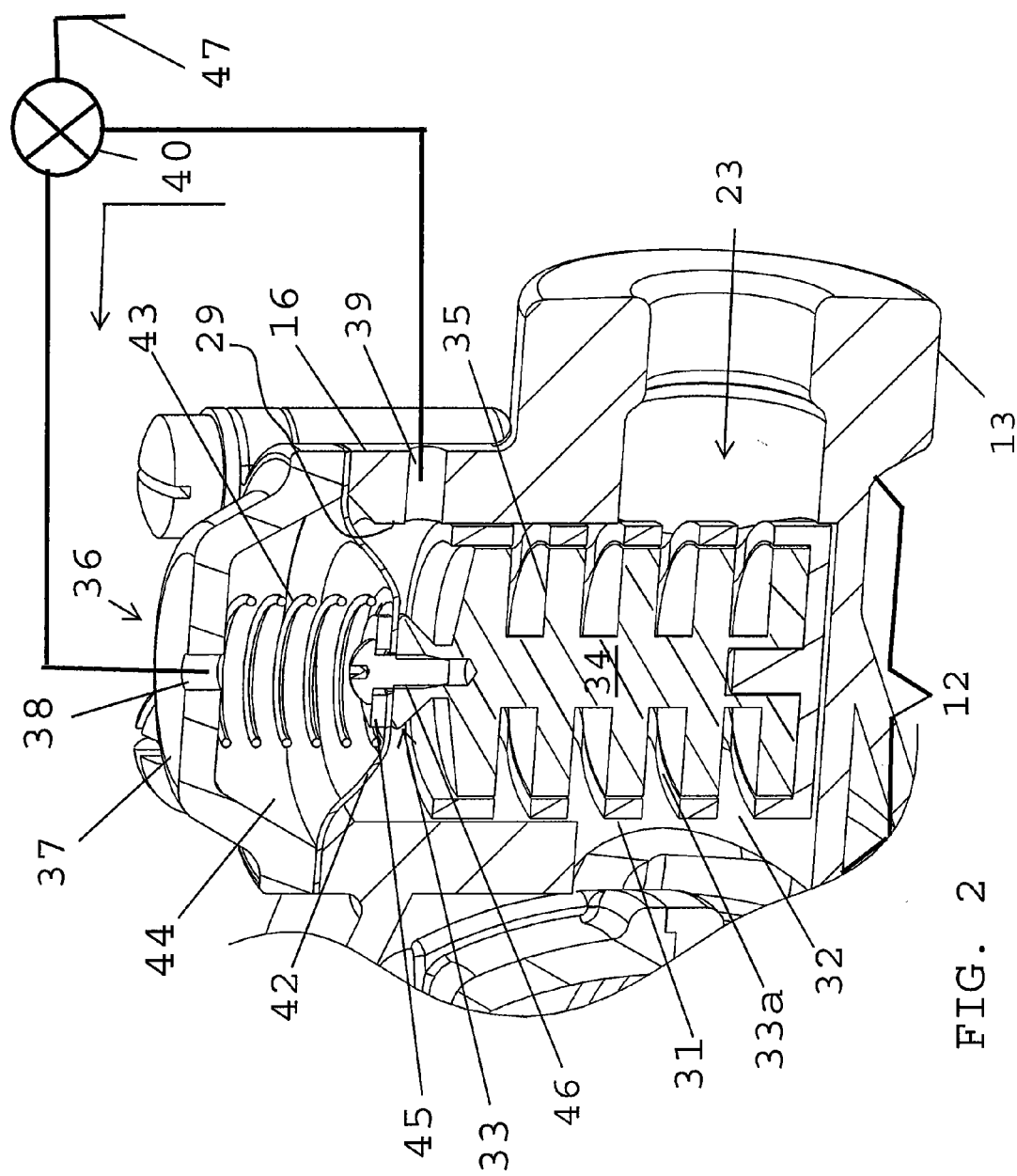
FIG. 2 is a detail view of a valve, which is part of the assembly of FIG. 1, in the open position.

The spool valve 30 is substantially vertically oriented in a location between the inlet spud end 13 and a cylindrical meter housing body 16. A substantially vertically oriented cylindrical chamber 29 is formed there to receive the spool valve 30 which further comprises a fixed valve cage 31 with side openings 32 and a reciprocally moveable valve member 33. The spool valve member 33 includes a spool valve shaft 34 and a plurality of disc-shaped spool bodies 35 spaced along the spool valve shaft 34. When the spaces 33a in the spool valve member 33 are aligned with the side ports 32 in the cage 31, as illustrated in FIGS. 1 and 2, water flows through the inlet 23 to the disc metering chamber 18 in FIG. 1. When the spool bodies 35 are aligned with the side ports 22 in the cage 21, and the spaces 33a are offset from the side ports 22 in an axial direction, as illustrated in FIG. 3, water flow into the disc metering chamber 18 and beyond is restricted as further described below.

The flow restriction valve 30 can be actuated using either a direct-acting electric solenoid or a hydraulic diaphragm that is controlled by a smaller pilot circuit that includes an electrically operable solenoid valve. The hydraulic actuation is preferred so that most of the energy required to actuate the valve is taken from the water pressure within the meter housing 16. The hydraulic control circuit is further controlled by a solenoid-controlled hydraulic valve 40 that requires very little electrical energy, and can therefore be powered by a small-capacity battery source.

Figure 3:
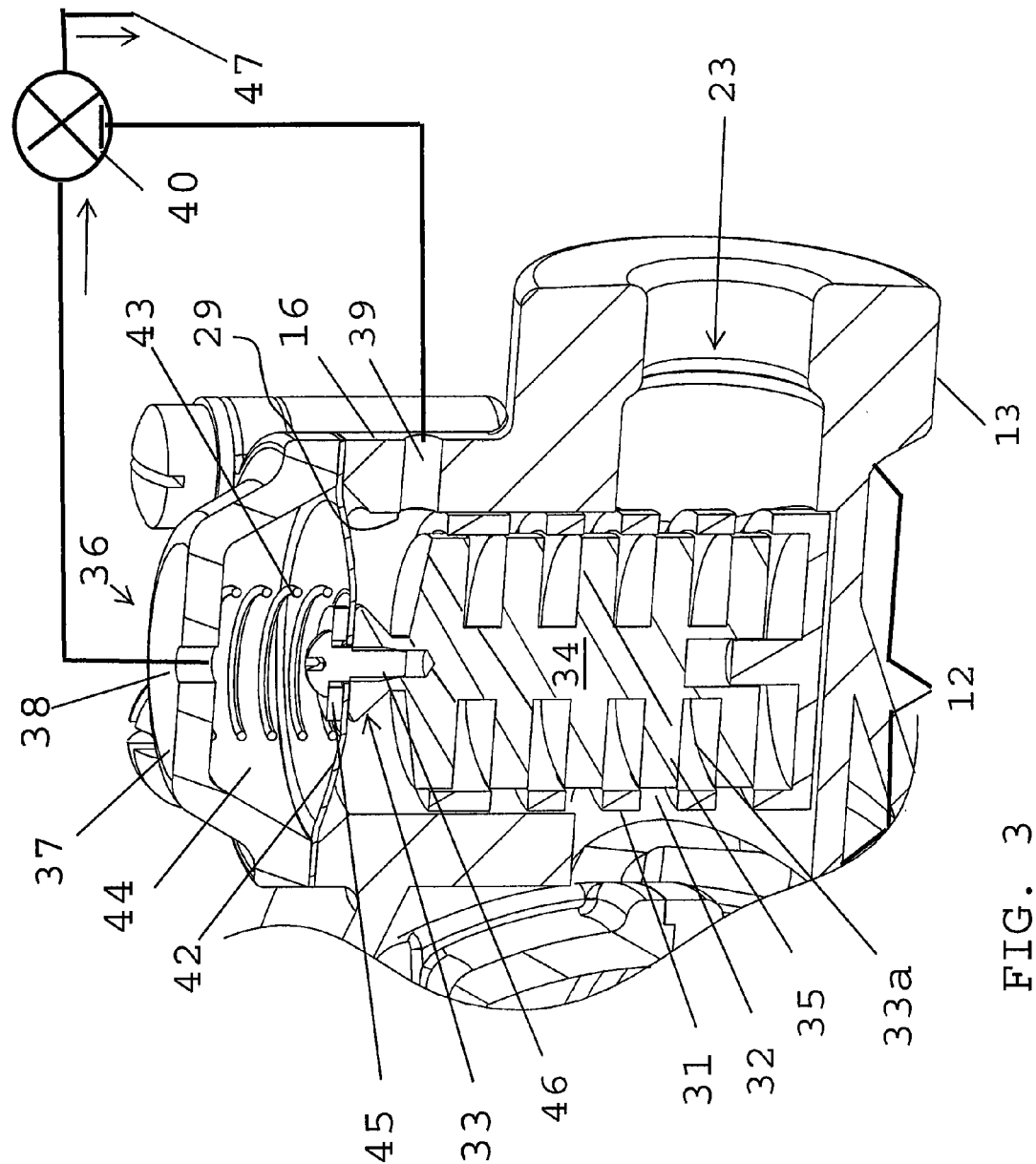
FIG. 3 is a detail view of the valve of FIG. 2 in a flow restriction position.

In more detail, and with reference to FIGS. 2 and 3, the reciprocal movement of the spool valve member 33 is controlled by a hydraulically operable diaphragm actuator 36. This diaphragm actuator 36 includes a non-moveable cap 37 having a port 38 for fluid communication with a diaphragm chamber 44. The valve 40 is an electrically operable, solenoid-controlled, multi-position, hydraulic valve 40. One of its ports is connected to the port 38 on the diaphragm valve cap 37 and another of its ports is connected to a port 39 on the meter body 16. This port 39 opens into the spool valve chamber 29 below a flexible diaphragm 42.

A return spring 43 is disposed in the diaphragm valve chamber 44 and is held between an underside of the diaphragm valve cap 37 and the flexible diaphragm member 42. The bottom end of the return spring 43 is fastened with a washer 45 and a threaded fastener 46 to a top end of the spool valve member 33. The return spring 43 is compressed when the diaphragm 42 is moved upward upon an exhausting of water through port 38, thereby relieving hydraulic pressure in the diaphragm valve chamber 44, which allows the diaphragm valve member 42 to move upward due to pressure from below. The diaphragm valve member 42 moves downward to a valve fully open position, when the hydraulic pressure is created in the diaphragm valve chamber 44 to equalize pressure created by water flowing through the main metering chamber 18.

Therefore, it can now be understood how the operation of the spool valve 30 is controlled by the diaphragm actuator 42, which in turn is controlled by the multi-position solenoid-operated hydraulic fluid control valve 40.

When in the open position, the side openings 32 of both the valve cage 31 and spool valve member 33 are aligned, allowing complete flow of water from the inlet 23 and through the disc metering chamber 18. The solenoid-controlled hydraulic valve 40 is not energized, and is in an open position such that fluid pressure present within the meter body 16 is applied equally to both sides of diaphragm 42. With no fluid pressure available to move the diaphragm 42, the spool valve member 33 is held in the open position by the valve positioning spring 43.

As seen in FIG. 3, in the closed position, the solenoid valve 40 has been energized and blocks the fluid pressure at port 39 from being applied to port 38. The position of the valve 40 also allows the fluid pressure which had been previously available on the top side of the diaphragm 42 to exhaust to atmospheric pressure through outlet 47, because the fluid pressure within the meter housing 16 is still available to the bottom side of the diaphragm 42. This pressure differential results in a net force that compresses the valve positioning spring 43 and raises the spool valve member 33 within the valve cage 31 until the openings 33a, 32 in both the spool valve member 33 and the valve cage 31 are now alternated, with the spool bodies now partially blocking the flow of water to the disc metering chamber 18.

The closed position of the valve 30 still allows a flow through the metering chamber which is less than the normal flow, but is a measureable flow sufficient for basic human needs. This restricted flow is considered to be in the range from 5% to 15% of normal flow, with 10% being typical. This type of restriction is provided by allowing a loose fit or enlarged tolerance in fit dimensions between the moveable valve member 33 and the valve cage 31, which are made of rigid, non-elastomeric materials such as plastics and metal. This can also be affected by controlling the stroke or position of the valve member 33 relative to the openings 32 in valve cage 31. This residual flow is also due to the lack of an elastomeric seal in the valve assembly 30 of a type that would completely interrupt or completely shut off flow to the disc metering chamber 18.

The solenoid-controlled hydraulic valve 40 receives command signals 48 from network data collector 28, the signals being received by the radio transceiver 25, and demodulated and decoded to provide an open or close signal to the valve 40 as seen in FIG. 1. The valve receives dc electrical power required for operation through a +VDC line originating from the power source 27 powering the radio transceiver 25. This power source 27 would typically comprise at least two 3.6-Volt, 2.4 Amp-hr lithium thionyl chloride batteries. It will be apparent to those of ordinary skill in the art, that in the future, other numbers and types of small, relatively low voltage and long-life batteries can be used.

Although the sliding gate valve 30 in this disclosure is shown to be cylindrical, it should also be understood that sliding gate valves of other shapes, such as flat plates or semi-circles can be shown to work as well. There may be molding or packaging advantages for valve shapes other than cylindrical. It is also contemplated that the control valve 40 and the flow restriction valve 30, 36 can be integrated within the water meter housing 16 to save space and simplify the assembly of the water meter/valve combination.

It should also be understood that the water meter 10 with restriction valve 30, the meter register 20, the radio receiver 25, the control valve 40 are all located at a customer site 50, which in some cases is a pit enclosure located in the ground. It should also be understood the that the network data collector 48 and radio transceiver 25 can be parts of a fixed network, or can be parts of a mobile network, where the network data collector 48 is carried in a vehicle or is carried by a person engaged in meter data collection.

This has been a description of preferred embodiments, and it will be apparent to those of ordinary skill in the art that variations may be made in the details of these specific embodiments without departing from the scope and spirit of the present invention, and that such variations are intended to be encompassed by the following claims.

We claim:

1. A flow restriction control apparatus for a water meter having a pressure vessel providing a flow path from a water supply inlet to a water supply outlet through a metering chamber, the flow restriction control apparatus comprising:
a flow control valve having a valve member disposed in a portion of the pressure vessel for movement between an open position allowing normal flow through the metering chamber and a flow restriction position in which flow in the metering chamber is limited to less than the normal flow;
an electrically operable control device for controlling operation of the flow control valve; and
wherein the electrically operable control device receives command signals to cause the flow control valve to restrict flow through the metering chamber to less than normal flow;
wherein the electrical control device receives power from a self-contained power source within a wireless reception radio transceiver that is located at a customer's site with the water meter.

2. The flow restriction control apparatus of claim 1, wherein the flow through the metering chamber is not completely interrupted or shut-off.

3. The flow restriction control apparatus of claim 1, wherein a portion of the pressure vessel is formed to contain the flow control valve in a pressure vessel having a same length as a water meter not having the flow restriction control so as to enable easy installation of the flow restriction apparatus.

4. The flow restriction control apparatus of claim 3, wherein the flow control valve is a spool valve having a valve cage with side ports and a spool valve member with a plurality of spaced apart spool bodies which are aligned with the side ports in the flow restriction position and offset from the side ports in the open position to allow normal water flow.

5. The flow restriction control apparatus of claim 4, wherein the spool valve member is positioned for movement substantially perpendicular to the path of water flow through the metering chamber.

6. The flow restriction control apparatus of claim 1, wherein the flow control valve has a valve member that is positioned for movement substantially perpendicular to the path of water flow through the metering chamber.

7. The flow restriction control apparatus of claim 1, wherein when the valve member is in the flow restriction position, flow through the metering chamber is less than the normal flow, but is a measureable flow sufficient for basic human needs.

8. The flow restriction control apparatus of claim 1, wherein the electrically operated control device includes a solenoid-operated hydraulic valve connected in a hydraulic circuit with a diaphragm-type actuator on the flow control valve so as to minimize electrical power needed to actuate the flow control valve in the pressure vessel.

9. The flow restriction control apparatus of claim 1, wherein the self-contained power source within the radio transceiver comprises at least two 3.6-Volt, 2.4 Amp-hr lithium thionyl chloride batteries.

10. The flow restriction control apparatus of claim 1, wherein the pressure vessel is made of a cast metal.

11. The flow restriction control apparatus of claim 1, further comprising a disk-type water meter with a nutating metering member housed within the pressure vessel.

12. The flow restriction control apparatus of claim 1, further comprising a radio transceiver located at a customer's site with the water meter and configured to transmit command signals to cause the flow control valve to restrict flow through the metering chamber to less than normal flow.

13. The flow restriction control apparatus of claim 12, further comprising a meter register assembled with the radio transceiver and mounted on the pressure vessel.

14. The flow restriction control apparatus of claim 13, wherein the meter register is electrically connected with the radio transceiver through an electrical cable.

15. The flow restriction control apparatus of claim 12, further comprising means configured for transmitting command signals to the radio transceiver to cause operation of flow control valve between the open position and the flow restriction position.

16. The flow restriction control apparatus of claim 1, wherein flow is restricted to a flow within a range from 5% to 15% of normal flow.

17. A flow restriction metering apparatus comprising:
a water meter including a pressure vessel providing a flow path from a water supply inlet to a water supply outlet through a metering chamber;
a flow control valve having a valve member disposed in a portion of the pressure vessel for movement between an open position allowing normal flow through the metering chamber and a flow restriction position in which flow in the metering chamber is limited to less than the normal flow;

a radio-controlled control device for controlling actuation of the flow control valve; and wherein the radio-controlled control device receives command signals to cause the flow control valve to restrict flow through the metering chamber to less than a normal flow, but does not completely interrupt or shut-off flow to the metering chamber.

18. The flow restriction metering apparatus of claim 17, wherein the flow control valve has a valve member having a first, valve-open position relative to a valve body receiving the valve member to allow normal flow to a metering chamber, and wherein the valve member has a second, valve-closed position relative to the valve body in which flow is restricted to a minimum flow sufficient for basic human needs during a period of flow restriction.

19. The flow restriction metering apparatus of claim 18, wherein the valve member and the valve body are made of rigid materials and tolerances such that a residual flow is allowed even when the valve member is in the closed position.

20. The flow restriction metering apparatus of claim 19, wherein the flow control valve is provided without an elastomeric seal of a type that would completely interrupt or completely shut off flow to the metering chamber.

21. The flow restriction metering apparatus of claim 17, wherein a portion of the pressure vessel is formed to contain the flow control valve in a pressure vessel having a same length as a water meter not having the flow restriction control so as to enable easy installation of the flow restriction apparatus.

22. The flow restriction metering apparatus of claim 17, wherein flow is restricted to a flow within a range from 5% to 15% of normal flow.

\* \* \* \* \*